(12) United States Patent
Massarweh et al.

(10) Patent No.: US 11,414,350 B2
(45) Date of Patent: Aug. 16, 2022

(54) CEMENT COMPOSITION CONTAINING AN OIL ASH SET RETARDER

(71) Applicant: King Fahd University of Petroleum and Minerals, Dhahran (SA)

(72) Inventors: Osama Ghanem Rashed Massarweh, Dhahran (SA); Mohammed Maslehuddin, Dhahran (SA); Salah Uthman Al-Dulaijan, Dhahran (SA); Mohammed Shameem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/257,810

(22) Filed: Jan. 25, 2019

(65) Prior Publication Data

US 2020/0239365 A1  Jul. 30, 2020

(51) Int. Cl.
| | |
|---|---|
| *C04B 28/04* | (2006.01) |
| *C04B 24/26* | (2006.01) |
| *C04B 18/06* | (2006.01) |
| *C04B 14/06* | (2006.01) |
| *C04B 103/22* | (2006.01) |
| *C04B 103/32* | (2006.01) |

(52) U.S. Cl.
CPC .............. *C04B 28/04* (2013.01); *C04B 14/06* (2013.01); *C04B 18/06* (2013.01); *C04B 24/2647* (2013.01); *C04B 2103/22* (2013.01); *C04B 2103/32* (2013.01); *C04B 2201/50* (2013.01)

(58) Field of Classification Search
CPC ......... C04B 14/06; C04B 14/28; C04B 18/06; C04B 18/087; C04B 24/2647; C04B 28/04; C04B 2103/22; C04B 2103/32; C04B 2111/00646; C04B 2201/50; Y02W 30/91

See application file for complete search history.

(56) References Cited

U.S. PATENT DOCUMENTS

| 8,945,300 B2 | 2/2015 | Al-Menthel et al. |
| 9,150,455 B2 | 10/2015 | Al-Menthel et al. |
| 9,266,776 B2 | 2/2016 | Al-Menthel et al. |
| 10,308,553 B2 * | 6/2019 | Maslehuddin ........ C04B 28/065 |
| 2017/0283319 A1 | 10/2017 | Maslehuddin et al. |

OTHER PUBLICATIONS

Camilleri, et al. ; The microstructure and physical properties of heavy oil fuel ash replaced Portland cement for use in flowable fill concrete and the production of concrete masonry units ; Construction and Building Materials vol. 38 ; pp. 970-979 ; Nov. 2, 2012 ; Abstract Only ; 2 Pages.

Al-Hamaiedh, et al. ; Using Oil Shale Ash in Concrete Binder; EJGE vol. 15 ; 2010 ; pp. 601-608 ; 8 Pages.

Al-Hasan ; Behavior of Concrete Made Using Oil Shale Ash and Cement Mixtures ; Oil Shale, vol. 23, No. 2 ; pp. 135-143 ; 2006 ; Abstract Only ; 1 page.

\* cited by examiner

*Primary Examiner* — Anthony J Green
(74) *Attorney, Agent, or Firm* — Oblon, McClelland, Maier & Neustadt, L.L.P.

(57) ABSTRACT

Oil ash comprising carbon in an amount in the range of 60% to 89% is an effective set retarder in a cement composition. The oil ash prolonged the initial and final setting time of cement paste and retained the slump flow in concrete for a longer time than concrete without the retarder. Also, the addition of oil ash to cement marginally improved the compressive strength of concrete. The advantage of oil ash is that it can be used as a solid retarder of cement hydration to substitute for the conventional commercial retarding admixtures with a limited shelf-life.

17 Claims, 4 Drawing Sheets

CEMENT COMPOSITION CONTAINING AN OIL ASH SET RETARDER

BACKGROUND OF THE INVENTION

Field of the Disclosure

This disclosure relates to a cement composition comprising oil ash as a set retarder and having increased initial and final setting time.

Description of the Related Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Fresh concrete mixtures must be workable enough to be transported, placed, and molded properly. The consistency of fresh concrete should be adequate for consolidation to maximum density without any excessive effort. Also, the mix needs to be sufficiently cohesive to resist segregation and sufficiently homogeneous to obtain high and regular strength. These properties can be modified by the use of set retarders.

Set retarders have several advantages in the concrete industry, including decreasing the accelerating effect of hot weather on concrete setting, prevention of cold joints that occur during interrupted concrete casting, and resistance of concrete cracks induced by form deflection. In mass concrete, retarders are also used to decrease the rate of heat generation and to prevent the formation of thermal cracks. Further, retarders are used in any application wherein concrete workability needs to be maintained or its setting time needs to be delayed.

When the cement paste is initially set, it becomes significantly hardened and cannot be molded anymore. Thus, any attempt of reshaping the concrete after initial setting causes a breakup of the early-age cement hydration products, and impairs the quality of concrete. Set retarders are generally used to achieve a delay in the setting of cement paste. According to the American Society for Testing and Materials (ASTM), retarding admixtures delay the setting time of cement. While retarding the setting time of concrete is highly desirable in many applications, the retarder should have no deleterious effect on the performance of the resulting concrete such as the compressive strength and drying shrinkage.

Currently, a wide range of chemicals, mostly liquids that have limited shelf life, are used for workability retention and retardation of setting time. Gypsum, common sugar, lignosulfonic acid, borates and phosphates are commonly used retarders. Set retarders are classified into organic and inorganic retarders. Organic retarders are more commonly used since they are less expensive. However, the commonly available commercial retarders are liquid-based and have limited shelf life. Consequently, there is a need to develop a solid-based retarder. A solid retarder may have a longer shelf-life compared to the liquid-based retarders. In the present invention an industrial byproduct, namely oil ash was used to develop a concrete set retarder.

Oil ash is produced by the combustion of oil in power plants. Electrostatic precipitators are used to capture the fine particles of oil ash to alleviate environmental pollution. The oil ash comprises mostly unburned carbon and sulfur and contains traces of inorganic compounds, such as aluminum oxide, iron oxide and magnesium oxide. Oil ash may also contain heavy metals, such as molybdenum, vanadium and nickel. It is a noteworthy that oil ash is substantially different from fly ash. Fly ash is a byproduct of burning of pulverized coal in electric power plants, and contains $SiO_2$, $Al_2O_3$, $Fe_2O_3$ and $CaO$.

U.S. Pat. No. 9,150,455B2 and U.S. Pat. No. 9,266,776B2 disclose methods of making self-compacting concrete by mixing cement and water, and adding heavy oil ash in an amount in the range of 1% to 10% by weight. The patent reference does not disclose the effect of the heavy oil ash on the setting time of cement.

U.S. Pat. No. 8,945,300B2 discloses a heavy oil ash cement high quality concrete comprising an aggregate having cementitious properties, fine heavy oil ash having at least 90% carbon, and Portland cement. The amount of the heavy oil ash is in the range of 5% to 10% of the total weight of the cement.

US20170283319A1 discloses a structural light weight concrete composition comprising cement, a fine aggregate, a natural and synthetic course aggregate, industrial waste in the form of fine particles, superplasticizer, and water. The preferred industrial waste is heavy oil ash containing at least 90% by weight carbon, which is added in an amount in the range of 0.5% to 10% by weight of the total weight of the concrete composition.

Camilleri et al. [Construction and Building Material (2013) 38, 970-979] disclose the addition of heavy oil fuel ash (HOFA) to Portland cement as a cement replacement leading to an extended setting time. A suitable flow fill concrete was achieved by no more than 30% HOFA.

Al-Hamaiedh et al. [http://ejge.com/2010/Ppr10.048.pdf] disclose the partial replacement of cement by oil shale ash and the properties of the resulting cement and concrete. They reported an increase in setting time of 20, 30, and 50 minutes for cement containing 10, 20, and 30% oil shale ash, respectively. The addition of oil shale ash to the cement decreased the compressive strength significantly of mortar cubes.

Al-Hasan, M. [Oil Shale (2006) 23 (2) 135-143] discloses the property of cement comprising oil shale ash. The reference reports that compressive strength of concrete containing oil shale ash decreased and the curing time increased with increasing the amount of oil shale ash.

The cement compositions disclosed by the aforesaid patent and non-patent references utilize heavy oil ash and oil shale ash. These ashes have different chemical compositions than the oil ash of the present invention. Heavy oil ash comprises at least 90% by weight carbon whereas oil ash used by the invention comprises significantly less than 90% carbon. While the non-patent reference indicated oil shale ash modestly increases the setting time, it was also indicated that compressive strength was significantly decreased.

It is one objective of the present disclosure to provide a cement composition comprising oil ash as a set retarder, and to provide a cement composition that has delayed setting without deleterious effect on the performance of the mortar or concrete products formed from the cement composition.

SUMMARY OF THE INVENTION

A first aspect of the invention is directed to a cement composition comprising Portland cement and oil ash in an amount of 0.5% to 10% by weight of the total weight of the cement composition, wherein the oil ash contains carbon in the amount in the range of 60% to 89% by weight of the total weight of the oil ash.

In a preferred embodiment, the oil ash comprises about 74% carbon.

In another preferred embodiment, the amount of oil ash is in the range of 2% to 5% of the total weight of the composition.

In another preferred embodiment, the amount of oil ash is in the range of 2% to 3% of the total weight of the composition.

In another preferred embodiment, the oil ash comprises carbon in an amount in the range of 70% to 80% by weight, oxygen in an amount in the range of 12% to 20% by weight, sulfur in amount in the range of 4.0% to 9.0% by weight, and vanadium in an amount in the range of 1.0% to 2.5% by weight.

In a preferred embodiment, the cement composition comprises one or more superplasticizers in an amount in the range 0.10 to 0.5% by weight of the total weight of cement.

In a preferred embodiment, the superplasticizer is a polycarboxylate ether superplasticizer.

In a preferred embodiment, the cement composition comprises one or more superplasticizers in an amount in the range 0.15 to 0.30% by weight of the total weight of cement A second aspect of the invention is directed to a mortar comprising the cement composition of the invention.

A third aspect of the invention is directed to a concrete mix comprising the cement composition, a fine aggregate, and a coarse aggregate.

In a preferred embodiment, the fine aggregate is sand having specific gravity in the range of 2.4 g/cm$^3$ to 3.0 g/cm$^3$ and water absorption in the range of 0.3% to 0.8%.

In another preferred embodiment, the coarse aggregate is selected from the group consisting of crushed lime stone and gravel.

A fourth aspect of the invention is directed to a method of increasing the initial and final setting time of a cement paste comprising:

mixing a cement with oil ash in an amount in the range of 0.5 to 10% of oil ash based on the total weight of the cement to form a mixture, and adding water to the mixture to form a cement paste, wherein the oil ash contains carbon in the range of 60% to 85% by weight of the total weight of the oil ash.

wherein the mixture does not contain a conventional set retarder, and wherein the cement paste has an initial setting time in the range of 145 to 235 minutes.

In a preferred embodiment, the method further comprises adding polycarboxylate ether superplasticizer to the cement paste in an amount in the range 0.10 to 0.5% by weight of the total weight of cement.

In a preferred embodiment, the use of oil ash as a set retarder increases the initial setting time of a cement paste made using the cement composition to range of about 4% to 70% of the setting time of cement paste without the oil ash.

In a preferred embodiment, the increase in final setting time is in the range of about 7% to 55% of the setting time of cement paste without the oil ash.

In another embodiment, the oil ash comprises about 74% carbon.

In another embodiment, the amount of oil ash is in the range of 2% to 5% of the total weight of the composition.

In a preferred embodiment, the amount of oil ash is in the range of 2% to 3% of the total weight of the composition.

In an embodiment, the oil ash comprising carbon in an amount in the range of 70% to 80% by weight, oxygen in an amount in the range of 12% to 20% by weight, sulfur in amount in the range of 4.0% to 9.0% by weight, and vanadium in an amount in the range of 1.0% to 2.5% by weight.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
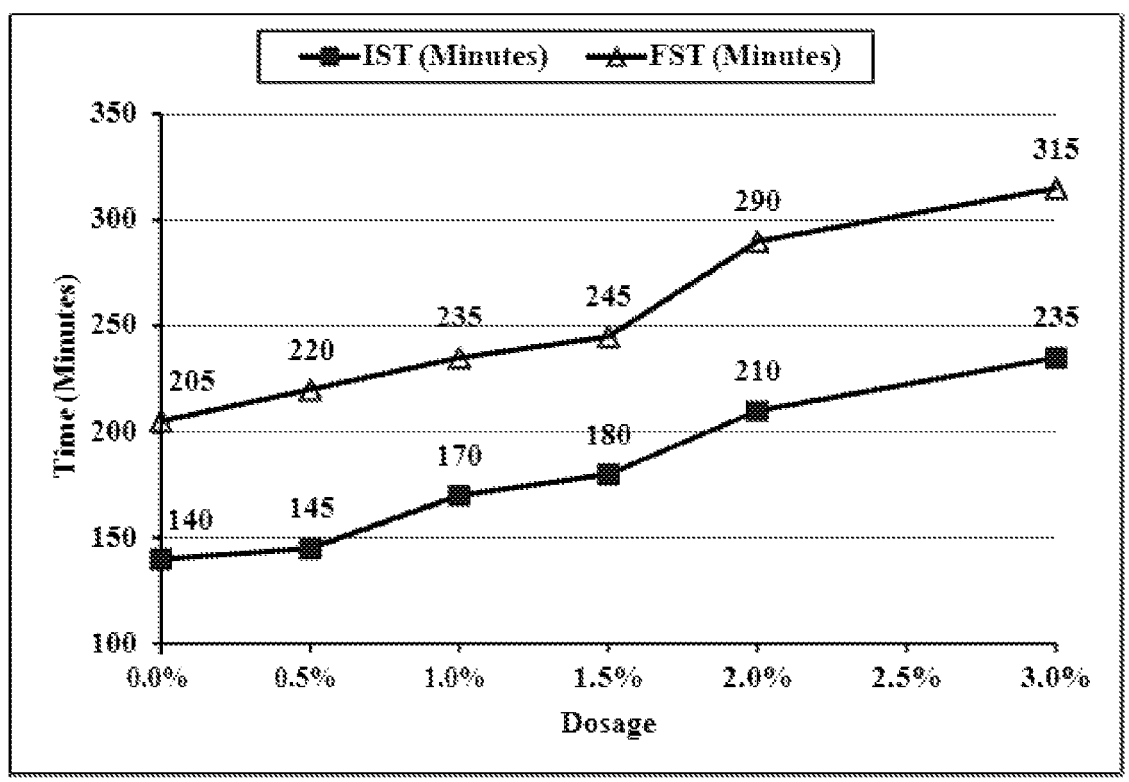
FIG. 1 shows a plot of initial (solid squares) and final (triangles) setting times of cement vs the weight percent of oil ash of the total weight of cement.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

As used herein, the terms "compound" and "complex" are used interchangeably, and are intended to refer to a chemical entity, whether in a solid, liquid or gaseous phase, and whether in a crude mixture or purified and isolated.

Unless otherwise specified, "a" or "an" means "one or more".

As used herein, the term "salt" refers to derivatives of the disclosed compounds wherein the parent compound is modified by making acid or base salts thereof. Exemplary salts include, but are not limited to, mineral or organic acid salts of basic groups such as amines, and alkali or organic salts of acidic groups such as carboxylic acids. The salts of the present disclosure can be synthesized from the parent compound that contains a basic or acidic moiety by conventional chemical methods. Generally, such salts can be prepared by reacting the free-acid or base forms of these compounds with a stoichiometric amount of the appropriate base or acid in water or in an organic solvent, or in a mixture of the two;

generally non-aqueous media like ether, ethyl acetate, ethanol, isopropanol, or acetonitrile are preferred.

As used herein a "polymer" or "polymeric resin" refers to a large molecule or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeating units together successively along the chain. The method by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another.

As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

As used herein, the term setting is used herein to describe the hardening of a cement paste.

A first aspect of the invention is directed to a cement composition comprising Portland cement and oil ash. Any oil ash may be used in the composition providing that the oil ash contains carbon in an amount in the range of 50% to 89%, preferably in the range of 60% to 85%, more preferably in the range of 65% to 80%, and most preferably in the range of 70% to 76% by weight of the total weight of the oil ash. In a particularly preferred embodiment, the carbon content of the oil ash is about 74% by weight of the total weight of the oil ash. Also, the oil ash may contain oxygen in an amount in the range of 12% to 20%, preferably in the range of 14% to 18%, more preferably in the range of 15% to 17%, and most preferably about 16.5% by weight of the total weight of the oil ash. In addition, the oil ash may contain sulfur in amount in the range of 4.0% to 9.0%, preferably in the range of 5.0% to 8.0%, more preferably in the range of 6.0% to 7.5%, and most preferably about 7.0% by weight of the total weight of the oil ash. Other elements may be found in smaller amounts in the oil ash including, but not limited to, vanadium in an amount in the range of 0.5% to 3.0%, preferably in the range of 1.0% to 2.5%, more preferably in the range of 1.4 to 2.0%, and most preferably in an amount of about 1.6% by weight of the total weight of the oil ash, magnesium in an amount in the range of 0.2 to 0.8%, preferably in the range 0.3% to 0.6%, and most preferably about 0.5% by weight of the total weight of the oil ash, and sodium in an amount in the range of 0.1% to 0.6%, preferably in the range of 0.2% to 0.4, and more preferably about 0.3% by weight of the total weight of the oil ash. The cement may be used as a component of a concrete mixture.

The main ingredients of concrete include, but are not limited to, cement, water, aggregates, chemical admixtures and mineral admixtures. There are many types of concretes created by varying the proportions of the main ingredients. In this manner or by substitution of the cementitious and aggregate phases, the finished product can be tailored to its application with varying strength, density, or chemical and thermal resistance properties. As used herein "concrete" refers to a composite material composed of aggregate bonded together with a fluid cement which hardens over time. In hydraulic cement concretes, when the aggregate is mixed together with the dry cement and water, they form a fluid mass that is easily molded into shape. The cement reacts chemically with the water and other ingredients to form a hard matrix which binds all of the materials together into a durable stone-like material that has many uses.

The cement of the present disclosure is a hydraulic cement, preferably a sulfoaluminous clinker, preferably Portland cement. As used herein, "Portland cement" refers to the most common type of cement in general use around the world developed from types of hydraulic lime and usually originating from limestone. It is a fine powder produced by heating materials in a kiln to form what is called clinker, grinding the clinker, and adding small amounts of other materials. The Portland cement is made by heating limestone (calcium carbonate) with other materials (such as clay) to >1400° C. in a kiln, in a process known as calcination, whereby a molecule of carbon dioxide is liberated from the calcium carbonate to form calcium oxide, or quicklime, which is then blended with the other materials that have been included in the mix to from calcium silicates and other cementitious compounds. The resulting hard substance, called "clinker" is then ground with a small amount of gypsum into a powder to make ordinary Portland cement (OPC). Several types of Portland cement are available with the most common being called ordinary Portland cement (OPC) which is grey in color. The low cost and widespread availability of the limestone, shales, and other naturally occurring materials used in Portland cement make it one of the low cost materials widely used throughout the world. However, Portland cement is caustic, can contain some hazardous components and carries environmental concerns, such as the high energy consumption required to mine, manufacture, and transport the cement and the related air pollution including the release of greenhouse gases, dioxins, $NO_x$, $SO_2$, and particulates.

Five types of Portland cements exist, with variations in the first three according to ASTM C150. Type I Portland cement is known as common or general purpose cement and it is generally assumed unless another type is specified. It is commonly used for general construction especially when making precast and precast-prestressed concrete that is not intended to be in contact with soils or ground water. The typical compound composition of this Type I cement, by weight relative to the total weight of the cement are: 55% ($C_3S$), 19% ($C_2S$), 10% ($C_3A$), 7% ($C_4AF$), 2.8% (MgO), 2.9% ($SO_3$), 1.0% ignition loss, and 1.0% free CaO. A limitation on the composition is that the ($C_3A$) shall not exceed 15%. Type II Portland cement gives off less heat during hydration. This type of cement costs about the same as Type I. This type is for general construction exposed to moderate sulfate attack and is intended for use when concrete is in contact with soils and ground water. The typical compound compositions of this Type II by weight relative to the total weight of the cement are: 51% ($C_3S$), 24% ($C_2S$), 6% ($C_3A$), 11% ($C_4AF$), 2.9% (MgO), 2.5% ($SO_3$), 0.8% ignition loss, and 1.0% free CaO. A limitation on the composition is that the ($C_3A$) shall not exceed 8%, which reduces its vulnerability to sulfates. Type III Portland cement has a relatively high early strength. The typical compound compositions of this Type III cement, by weight relative to the total weight of the cement are: 57% ($C_3S$), 19% ($C_2S$), 10% ($C_3A$), 7% ($C_4AF$), 3.0% (MgO), 3.1% ($SO_3$), 0.9% ignition loss, and 1.3% free CaO. This cement is similar to Type I but ground finer. In some cases a separate clinker with higher $C_3S$ and/or $C_3A$ content may be used, ground to a specific surface area that is typically 50-80% higher. The gypsum level may also be slightly increased. This gives the concrete using this Type III of cement a three day compressive strength equal to the seven day compressive strength of Types I and II. The Type III seven day compressive strength is almost equal to the 28-day compressive strengths of Types I and II, the downside being that the six month strength of Type III is the same or slightly less than that of Types I and II. Type IV Portland cement is generally known for its low heat of hydration. The typical compound compositions of this Type IV by weight relative to the total weight of the cement: 28% ($C_3S$), 49% ($C_2S$), 4% ($C_3A$), 12% ($C_4AF$), 1.8% (MgO), 1.9% ($SO_3$), 0.9% ignition loss, and 0.8% free CaO. The percentages of ($C_2S$) and ($C_4AF$) are relatively high and ($C_3S$) and ($C_3A$) are relatively low. A limitation on this type of composition is that the maximum percentage of ($C_3A$) is 7% and the maximum percentage of ($C_3S$) is 35%. This causes the heat given off by the hydration reaction to develop at a slower rate. However, as a consequence the strength of concrete using this type develops slowly, after one to two years the strength is more than other types after full curing. Type V Portland cement is used where sulfate resistance is important. The typical compound compositions of this Type V by weight relative to the total weight of the cement are: 38% ($C_3S$), 43% ($C_2S$), 4% ($C_3A$), 9% ($C_4AF$), 1.9% (MgO), 1.8% ($SO_3$), 0.9% ignition loss, and 0.8% free CaO. This cement has a very low ($C_3A$) composition which accounts for its high sulfate resistance. The maximum content of ($C_3A$) allowed is 5% for Type V Portland cement. Another limitation is that the ($C_4AF$)+2($C_3A$) composition cannot exceed 20%. This Type V is used in concrete to be exposed to alkali soil and ground water sulfates which react with ($C_3A$) causing disruptive expansion. Types IA, IIA, and IIIA have the same composition as Types I, II, and III with an air-entraining agent ground into the mix. Types II (MH) and II (MH)A have a similar composition to Types II and IIA, but with a mild heat. In terms of the present disclosure, the cement of the concrete composition may be Portland cement, and may be an ASTM C150 Type I Portland cement, an ASTM C150 Type II Portland cement, an ASTM C150 Type III Portland cement, an ASTM C150 Type IV Portland cement, an ASTM C150 Type V Portland cement, a Type IA Portland cement, a Type IIA Portland cement, a Type IIIA Portland cement, a Type II(MH) Portland cement, a Type II(MH)A Portland cement or mixtures thereof, preferably an ASTM C150 Type I Portland cement.

In some preferred embodiment of the invention, the oil ash is a black powder having a specific gravity in the range of 0.4 g/cm³ to 0.9 g/cm³, preferably in the range of 0.5 g/cm³ to 0.8 g/cm³, and more preferably in the range of 0.5 g/cm³ to 0.7 g/cm³, and most preferably about 0.6 g/cm³. The average particle size of the oil ash is preferably in the range of 45 μm to 95 μm, more preferably in the range of 65 μm to 85 μm, and most preferably in the range of 70 μm to 80 μm. In a particularly preferred embodiment, the average particle size is less than 75 μm.

The amount of oil ash added to the cement may vary depending on the desired application of the cement composition and environmental conditions, such as temperature and humidity. In some embodiments, the amount of oil ash in the cement composition is in the range of 0.5% to 10%, preferably in the range of 1.0% to 8.0%, more preferably, in the range of 2.0% to 5%, and most preferably in the range of 2.0% to 3.0% by weight of the total weight of the cement composition.

Superplasticizers, also known as high range water reducers, are chemical admixtures used where a well-dispersed particle suspension is required. They are polymers used as dispersants to avoid agglomeration of particles, such as gravel, and coarse and fine sands, and to improve the flow characteristics (rheology) of suspensions, such as mortar and concrete. Superplasticizers are added to concrete or mortar to reduce the water to cement ratio without negatively affecting the workability of the mixture, and enable the production of self-consolidating and high performance concrete. The addition of superplasticizers to a cement mix substantially improves the performance and hardening of fresh cement paste. As the water to cement ratio decreases, the strength of the resulting concrete increases.

The addition of a superplasticizer during transit of concrete mortar and mix is a fairly new development within the industry. Admixtures added in transit through automated slump management systems allow concrete producers to maintain slump until discharge without reducing concrete quality.

Traditional superplasticizers have generally been manufactured from sulfonated naphthalene condensate or sulfonated melamine formaldehyde polymers. Traditional superplasticizers disperse the flocculated cement particles through a mechanism of electrostatic repulsion as the long chain polymers are adsorbed on to the cement particles leading to a negatively charged particles and creating repulsion between the particles. Polycarboxylate ether superplasticizers (PCE) represent a newer generation of superplasticizers. PCEs function differently from traditional superplasticizers by dispersing cement particles through steric stabilization and are more effective in improving the workability retention in cementitious mixes.

PCEs have a methoxy-polyethylene glycol copolymer (side chain) grafted on a methacrylic acid salt copolymer (main chain). In water, the carboxylate salt groups dissociate to provide negatively charged carboxylate groups along the PCE backbone. The polyethylene oxide groups provide uniform distribution of hydrophilic residues along the polymer main chain. The number and the length of side chains are flexible parameters that may be modified to produce a PCE with desired charge density.

In some embodiments of the invention, the cement composition comprises superplasticizers in an amount in the range 0.05% to 0.7%, preferably in the range of 0.10 to 0.5%, more preferably in the range of 0.15% to 0.4%, and most preferably in the range of 0.15% to 0.3% by weight of the total weight of cement composition.

A second aspect of the invention is directed to a mortar comprising the cement composition of the invention. Mortar is a workable paste used to bind building blocks and/or aggregates such as stones, bricks, and concrete masonry units, to fill and seal irregular gaps between them. In many instances, mortar is modified to add decorative colors or patterns to masonry walls. In its broadest sense mortar includes pitch, asphalt, and soft mud or clay, such as used between mud bricks.

Cement mortar becomes hard when it cures, resulting in a rigid aggregate structure; however the mortar is intended to be weaker than the building blocks and acts as a sacrificial element in the masonry because mortar is easier and less expensive to repair than the building blocks. Mortars are typically made from a mixture of fine aggregates, a binder, and water. The most common binder since the early 20th century is Portland cement. The binder of the mortar of the invention comprises the cement composition disclosed herein comprising Portland cement and oil ash. It is prepared by mixing the cement composition of the invention with fine aggregates, such as sand and water.

A third aspect of the invention is directed to a concrete mix comprising the cement composition of the invention, a fine aggregate, and a coarse aggregate. The fine aggregates may be any sand from any source, such as desert sand or beach sand. It may be predominantly quartz sand having specific gravity of about 2.65 g/cm$^3$, carbonate sand composed of mineral with specific gravity of about 2.71 g/cm$^3$, or dark sand such as the black volcanic beach sand of Hawaii having higher specific gravity as they contain iron minerals. In a preferred embodiment, the fine aggregate is sand having specific gravity in the range of 2.4 g/cm$^3$ to 3.0 g/cm$^3$ and water absorption in the range of 0.4% to 0.7%, more preferably in the range of 2.45 g/cm$^3$ to 2.8 g/cm$^3$ and water absorption in the range of 0.45% to 0.6%, and most preferably in the range of 2.5 g/cm$^3$ to 2.6 g/cm$^3$ and water absorption of about 0.4%. In a particular preferred embodiment, the fine aggregate is a desert sand having specific gravity of about 2.53 g/cm$^3$ and water absorption of about 0.5%.

In another preferred embodiment, the coarse aggregate is selected from the group consisting of crushed limestone, crushed basalt, and gravel. The coarse aggregate may vary in size depending on the desired application. In some embodiment, the coarse aggregates have a nominal aggregate size in the range of 5 mm to 50 mm, preferably in the range of 10 mm to 30 mm, more preferably in the range of 10 mm to 20 mm, and most preferably about 12.5 mm.

A fourth aspect of the invention is directed to a method of increasing the initial and final setting time of a cement paste comprising:

mixing a cement with oil ash in an amount in the range 0.5 to 10% of oil ash based on the total weight of the cement to form a mixture, and adding water to the mixture to form a cement paste, wherein the oil ash contains carbon in the amount in the range of 60% to 85% by weight of the total weight of the oil ash, wherein the mixture does not contain a conventional set retarder, and wherein the cement paste has an initial setting time in the range of 145 to 235 minutes that is 5-70% greater than the setting time of a cement paste without the oil ash.

The increase in initial setting time is dependent on the amount of oil ash in the cement composition as the setting time increases with increasing the amount of oil ash. In some preferred embodiment, the increase of the initial setting time is in the range of about 4% to 70%, preferably 25% to 70%, and more preferably in the range of 50% to 70% of the setting time of cement paste without the oil ash. Similarly, the final setting time is increased with increasing the amount of oil ash. In some preferred embodiment, the increase in the final setting time is in the range of 7% to 55%, preferably 20% to 55%, more preferably 30% to 55%, and most preferably in the range of 40% to 55% of the setting time of cement paste without the oil ash.

Example 1

Methodology:

Several trial mixtures were prepared to demonstrate the effect of oil ash on the initial and final setting time of cement paste. Subsequently, concrete mixtures were prepared with the dosages of oil ash to provide increased setting time. The prepared concrete specimens were tested to evaluate the setting time, slump retention, compressive strength and drying shrinkage.

Materials:

Ordinary Portland cement (OPC) satisfies the requirements of ASTM C150, and has a specific gravity of 3.15 g/cm$^3$. The fine aggregate was desert sand with a specific gravity of 2.56 g/cm$^3$ and water absorption of 0.5%. The coarse aggregate comprised crushed limestone with a nominal maximum aggregate size of ½ in (12.5 mm), and has a specific gravity of 2.6 g/cm$^3$ and a water absorption of 1.1%. Black powder oil ash has a specific gravity of 0.6 g/cm$^3$ with particle size of less than 75 µm. The elemental composition of oil ash is shown Table 1. Polycarboxylate ether superplasticizer was used in an amount of 0.65 wt. % of the total weight of cement.

TABLE 1

| Elemental composition of oil ash | |
|---|---|
| Element | Weight % |
| Carbon | 74.1 |
| Oxygen | 16.4 |
| Sulfur | 7.1 |
| Vanadium | 1.6 |
| Magnesium | 0.5 |
| Sodium | 0.3 |

Example 2

Preparation of Cement Paste, Mortar and Concrete Mixtures:

Cement paste mixtures were used to evaluate the effect of oil ash on the initial and final setting time of cement. The dosages of oil ash were 0.5, 1.0, 1.5, 2.0 and 3.0% by weight of cement. Mortar specimens were prepared using 750 g of cement and 1500 g of fine aggregate (sand) as required by ASTM C596. Concrete specimens were prepared with a cement content of 375 kg/m$^3$ to evaluate compressive strength. The coarse/fine aggregate ratio was 1.5 and the effective water/cement ratio was 0.40. In slump retention test, the cement content was kept constant, and the water/cement ratio was increased to 0.45 and 0.65% superplasticizer, by weight of the cement, was incorporated in the mixture to improve the workability of the concrete.

The cement paste was mixed according to the method described in ASTM C305. The paste constituents were mixed in an electrically powered mechanical mixer. All the mixing water was placed in the bowl mixer and then the required weights of oil ash and cement were slowly added. The constituents in the bowl were mixed thoroughly until a uniform consistency was obtained. The paste was then placed in a mold of a Vicat apparatus and the initial and final setting time was measured.

The mortar mixture was prepared according to the method described in ASTM C305. The mortar constituents were mixed in an electrically-powered mechanical mixer. All the mixing water was placed in the bowl and then the required quantities of oil ash and cement were slowly added to the mixing water. Subsequently, the added materials were mechanically mixed for 30 seconds at slow speed. The mixing was continued until a uniform consistency was obtained. The mortar was placed in a mold designated for four drying shrinkage specimens, and compacted in two layers using a tamper, and then the mold was covered with an impervious plastic sheet for 24 hours to retain the moisture. Subsequently, the mortar specimens were demolded and stored in lime-saturated water for 28 days at a temperature of about 25° C.

The concrete components were mixed in an electrically driven laboratory concrete mixer according to ASTM C192. First, the coarse aggregate and some of the mixing water were placed in the mixing drum and mixed for few revolutions. After that, the fine aggregate was added to the mixer and mixed with the coarse aggregate. Oil ash and cement were initially blended in dry condition, and then they were added to the coarse and fine aggregate followed by the remaining mix water. The mixing was continued until a uniform consistency was obtained.

The concrete was placed in cylindrical molds and they were vibrated to achieve proper consolidation. After consolidation and levelling, the molds were covered with a plastic sheet for 24 hours and they were later removed from the molds and cured in water at a temperature of about 23° C. until testing.

The fresh concrete was discharged from the mixer and the slump was measured at regular intervals until loss of workability. This provided information on the slump retention of the tested mixture.

Example 3

Properties of Oil Ash in Cement Paste, Mortar and Concrete:

The setting time of cement paste was measured to evaluate the efficiency of oil ash as a set retarder. A Vicat apparatus was used to measure the initial and final setting time, according to ASTM C191. The setting time was determined from the instant of placing the cement in the Vicat apparatus. According to the standard, the initial setting time is the time needed for the 1-mm Vicat needle to penetrate 25 mm into the cement paste. The final setting time is denoted as the time at which the 1-mm Vicat needle does not sink visibly into the paste. FIG. 1 shows a plot of initial (solid squares) and final (triangles) setting times of cement vs the weight percent of oil ash of the total weight of cement. The initial setting time of cement paste comprising the oil ash is observed in the range of 145 minutes to 235 minutes, which is more than that of cement paste without the oil ash (140 minutes). Similarly, the final setting time of cement paste comprising oil ash is observed in the range of 220 to 315 minutes, which is significantly more than that of cement paste without the oil ash (205 minutes).

Figure 2:
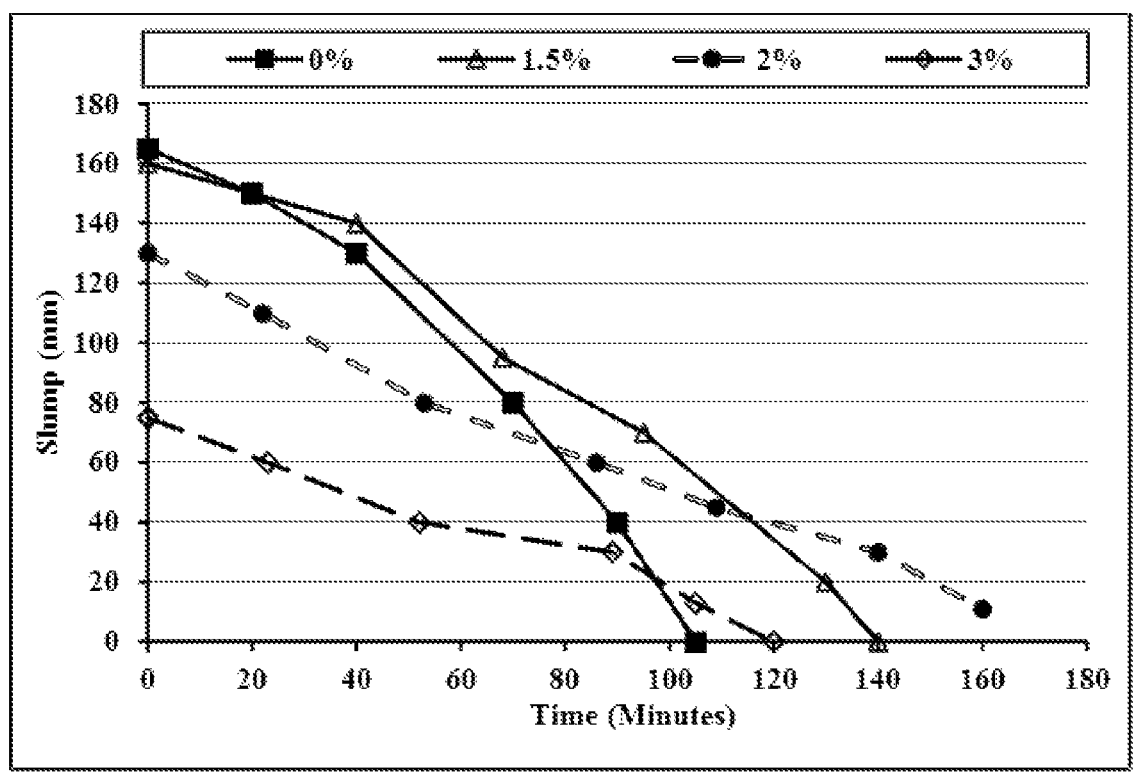
FIG. 2 shows a plot of slump retention in concrete vs. time at various weight percentages of oil ash of the total weight of cement.

Slump retention in freshly mixed concrete was measured in accordance with ASTM C143. The test was conducted on concrete incorporating different proportions of oil ash. Slump values in each specimen were measured at different time periods to determine the slump retention over time. A standard mold that has the shape of a cone of a frustum (slump cone) was filled with fresh concrete and it was consolidated in three layers. During the placement of concrete, the mold was held firmly on a non-absorbent surface. Later, the mold was slowly lifted, allowing the concrete to slump freely. The length of the space between the initial and final levels of the displaced center of the slumped concrete is determined and recorded to represent the slump value. The test was conducted at regular periods until the concrete lost its workability. FIG. 2 shows a plot of slump retention in concrete vs. time at various weight percentages of oil ash of the total weight of cement. The slump retention in concrete with the oil ash is observed in the range of 120 to 160 minutes, whereas that without oil ash is 105 minutes.

Figure 3:
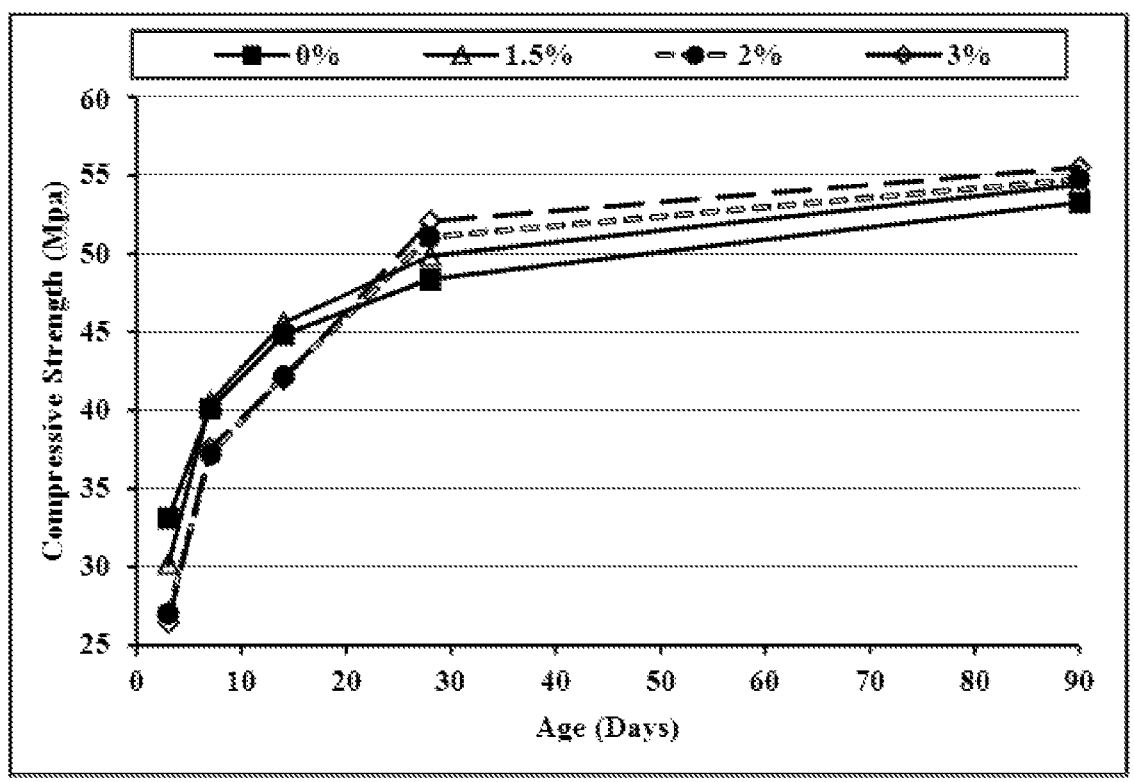
FIG. 3 shows a plot of compressive strength of concrete vs. the age of concrete at various weight percentages of oil ash of the total weight of cement.

The compressive strength of concrete specimens was evaluated according to ASTM C39, after 3, 7, 14, 28 and 90 days of water curing. Cylindrical concrete specimens measuring 75 mm in diameter and 150 mm high were used to determine the compressive strength. An automatic, hydraulic compression testing machine with a 3000 kN capacity was used to determine the compressive strength. At each age, three cylinders were capped with sulfur to obtain parallel and smooth surfaces for an even distribution of the load. The compression load was applied at a stress rate of 0.22 MPa/s until failure. Three specimens were tested at each age and for each mix and the average compressive strength was calculated. FIG. 3 shows a plot of compressive strength of concrete vs. the age of concrete at various weight percentages of oil ash of the total weight of cement. The 28-day compressive strength of concrete with the oil ash retarder was in the range of 49.9 MPa to 52.1 MPa compare to that without the retarder of 48.4 MPa.

Figure 4:
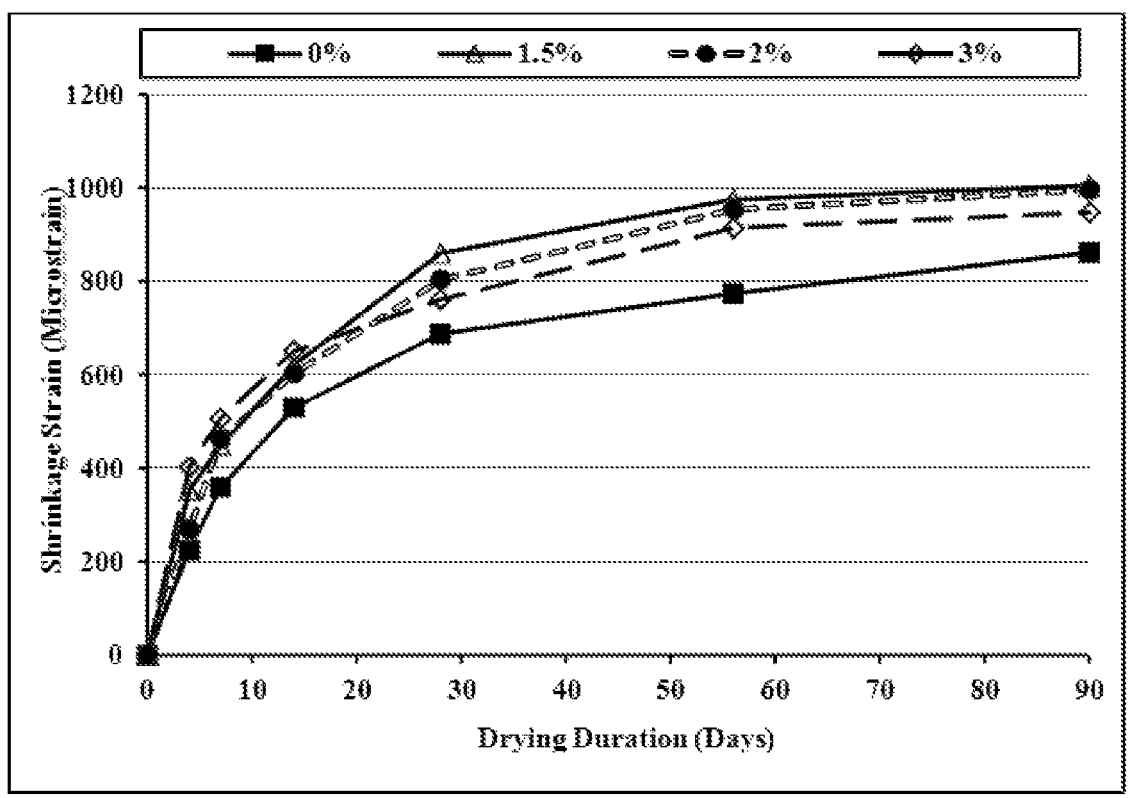
FIG. 4 shows a plot of shrinkage strain of mortar vs. drying time at various weight percentages of oil ash of the total weight of cement.

The drying shrinkage of mortar specimens was evaluated according to ASTM C157. Prismatic mortar specimens measuring 25×25×285 mm were used to determine the drying shrinkage. A setup comprising a portable data logger and a linear variable displacement transducer (LVDT) was used to measure the change in length of each prism over time. During the test, a frame with a smooth base was used to hold the specimen at a fixed vertical position, and a standard rod of a known length was used to reset the reading of the data logger to zero prior to each measurement. An initial reference reading of the length of each prism was taken in a saturated surface dry condition after 28 days of curing. Later, the drying shrinkage was measured at 4, 7, 14, 28, 56 and 90 days of air exposure starting after the curing period. FIG. 4 shows a plot of shrinkage strain of mortar vs. drying time at various weight percentages of oil ash of the total weight of cement. The 90-day drying shrinkage strain of mortar with the oil ash retarder is in the range of 947 to 1005 microns, whereas that of mortar without retarder (861 microns).

Oil ash that is generated by the combustion of oil in a power plant is disclosed as cement set retarder. The use of 2% and 3% of oil ash by weight of the total weight of cement caused a significant increase in the initial and final setting time of cement paste. The incorporation of the oil ash set retarder in the cement significantly increased the slump retention and marginally affected the compressive strength as well as the drying shrinkage.

The oil ash set retarder can be used as a solid retarder in applications where an increase in the setting time is required without adversely affecting the compressive strength of concrete. From an environmental perspective, the use of oil ash as retarder in concrete will solve the problem of its disposal, including transportation and storage.

The invention claimed is:
1. A cement composition, comprising:
   Portland cement and an oil ash in an amount of 0.5% to 10% by weight of the total weight of the cement composition, wherein the oil ash comprises 70% to 80% by weight of carbon, oxygen in an amount in the range of 12% to 20% by weight, sulfur in an amount in the range of 4.0% to 9.0% by weight, and vanadium in an amount in the range of 1.0% to 2.5% by weight, wherein % by weight is based on the total weight of the oil ash.

2. The cement composition of claim 1, wherein the oil ash comprises 74±3.7 wt % carbon.

3. The cement composition of claim 1, wherein the amount of oil ash is in the range of 2% to 5% of the total weight of the composition.

4. The cement composition of claim 1, wherein the amount of oil ash is in the range of 2% to 3% of the total weight of the composition.

5. The cement composition of claim 1, further comprising:
a superplasticizer in an amount in the range of 0.10 to 0.5% by weight of the total weight of cement.

6. The cement composition of claim 5, wherein the amount of the superplasticizers is in the range 0.15 to 0.30% by weight of the total weight of cement.

7. The cement composition of claim 5, wherein the superplasticizer is a polycarboxylate ether superplasticizer.

8. A mortar comprising the cement composition of claim 1 and water.

9. A concrete mix comprising the cement composition of claim 1, a fine aggregate, and a coarse aggregate.

10. The concrete mix of claim 9, wherein the fine aggregate is sand having specific gravity in the range of 2.4 g/cm$^3$ to 3.0 g/cm$^3$ and water absorption in the range of 0.3% to 0.8%.

11. The concrete mix of claim 9, wherein the coarse aggregate is selected from the group consisting of crushed lime stone and gravel.

12. A method of increasing the initial and final setting time of a cement paste, comprising:
mixing a cement with an oil ash in an amount in the range of 0.5 to 10% of oil ash based on the total weight of the cement to form a mixture, and
adding water to the mixture to form a cement paste,
wherein the mixture does not contain a conventional set retarder,
wherein the cement paste has an initial setting time in the range of 145 to 235 minutes that is from 5 to 75% greater than the setting time of an equivalent cement paste not containing the oil ash set retarder, and
wherein the oil ash comprises 70 wt. % to 8-wt. % carbon, oxygen in an amount in the range of 12% to 20% by weight, sulfur in amount in the range of 4.0% to 9.0% by weight, and vanadium in an amount in the range of 1.0% to 2.5% by weight.

13. The method of claim 12, further comprising:
adding a polycarboxylate ether superplasticizer to the cement in an amount in the range 0.10 to 0.5% by weight of the total weight of cement.

14. The method of claim 12, wherein the increase in initial setting time is in the range of about 5% to 60% of the setting time of cement paste without the oil ash.

15. The method of claim 12, wherein the increase in final setting time is in the range of about 7% to 55% of the setting time of cement paste without the oil ash.

16. The method of claim 12, wherein the amount of oil ash is in the range of 2% to 5% of the total weight of the composition.

17. The method of claim 16, wherein the amount of oil ash is in the range of 2% to 3% of the total weight of the composition.

* * * * *